United States Patent Office 3,755,554
Patented Aug. 28, 1973

3,755,554
PREPARATION OF IRON OXIDE AND
HYDRATED IRON OXIDE PIGMENTS
Günter Lailach, Krefeld, Fritz Rodi, Kaldenhausen, Heribert Bade, Krefeld, and Heinz Köller, Krefeld-Bockum, Germany, assignors to Bayer Aktiengesellschaft, Leverkusen, Germany
No Drawing. Filed May 25, 1971, Ser. No. 146,787
Claims priority, application Germany, June 13, 1970,
P 20 29 300.9
Int. Cl. C01g 49/06
U.S. Cl. 423—633                    3 Claims

ABSTRACT OF THE DISCLOSURE

Treatment of metallic iron containing material with oxygen containing gases in the presence of an aqueous, slightly acid ferrous salt solution characterized by addition of the metallic iron containing material as a finely divided power into the reaction mixture at a rate maintaining the pH between 1 and 6, preferably between 3 and 6. Modifying substances such as $\alpha$-FeOOH, $\gamma$-FeOOH, $\delta$-FeOOH and $\alpha$-Fe$_2$O$_3$ may be employed.

---

It is known that iron oxide pigments and hydrated iron oxide pigments can be prepared by the oxidation of ferrous salt solutions with oxidizing agents such as atmospheric oxygen in the presence of metallic iron. The iron oxide phase thus obtained and the quality of the resulting iron oxide pigment are materially influenced by the addition of a suspension of very finely divided modifying material or nuclei. The process of preparing the pigments as well as preparing the nuclear suspensions has already been described in numerous publications such as U.S. patent specifications Nos. 1,368,748; 2,111,727 and 2,633,407, German patent specifications Nos. 902,163 and 1,040,155 and British patent specifications Nos. 691,457 and 976,724.

In these processes, hydrogen ions are produced by the oxidation and subsequent hydrolysis of the ferrous salt, and these hydrogen ions are neutralized with metallic iron, which, in this case, acts as a base. The metallic iron used in the above mentioned processes is usually scrap iron, which is in the form of large particles or pieces. The reaction velocities which can be obtained in these processes and hence the volume/time yields are low.

It has therefore been proposd in numerous processes such as described in U.S. specifications Nos. 2,388,659 and 2,939,767 to use basic compounds instead of metallic iron as proton acceptors. In this way, the reaction mixture can, of course, be adjusted to any required pH value. These processes have the disadvantage that the precipitating agents required (e.g. soda, ammonia, or a sodium hydroxide solution) are very expensive, and moreover it is difficult to distribute the precipitating agents so uniformly in the reaction medium that localized variations in the pH are avoided. This results in lack of uniformity of pigment formation. In one case, the use of a combination of metallic iron and ammonia as the basic precipitating agent has been described (French patent specification No. 1,487,031).

An improved process for the preparation of iron oxide pigments and hydrated iron oxide pigments by treating an aqueous, slightly acid ferrous salt solution with an oxygen-containing gas in the presence of metallic iron-containing material has now been found. This process is characterised by the steps of introducing the metallic iron as a finely divided powder having a particle size of between 0.5$\mu$ and 500$\mu$ into the aqueous solution at a rate maintaining the pH of the solution during formation of the pigment between 1 and 6, preferably between 3 and 6, while agitating said solution to maintain said introduced metallic iron in suspension. It is found, surprisingly, that this method of using metallic iron as proton acceptor or precipitating agent obtains a substantial increase in the volume/time yield as well as a pure, high quality pigment. Localised fluctuations in the pH are prevented by having the iron powder uniformly in the whole reaction medium, and a better pigment is obtained than has been possible, with the processes hitherto known.

Another advantage of the process according to the invention is that the addition of the highly reactive iron-containing material, which contains iron can be carried out continuously and automatically. The rate of addition is regulated by measuring the pH of the suspension. This enables the process to be carried out very economically.

Preparation of the pigments is generally carried out by heating an aqueous ferrous salt solution which may contain modifying compounds, such as $\alpha$-FeOOH, $\gamma$-FeOOH, $\delta$-FeOOH and $\alpha$-Fe$_2$O$_3$ and, while a gas which contains oxygen is blown through the reaction mixture, adding a predetermined quantity of the finely divided iron-containing material at such a rate that the required pH value is maintained. When the reaction is completed, the resulting pigment is freed from residues of the iron-containing powder by one of the known wet working up processes in conventional manner.

The iron-containing materials to be used are mainly those which can be obtained from readily accessible starting materials. If the iron is present in the form of iron compounds in the starting material, the iron-containing materials can be prepared by any method which enables these iron compounds to be reduced to metallic iron. These materials may advantageously be prepared by the known processes for the direct reduction of iron-containing ores, for example the process according to U.S. patent specification Nos. 2,638,414 or 2,900,246 using a fluidized bed layer, the known Krupp-Renn process or the SL-RN process (see Gmelin-Durrer, Metallurgie des Eisens, Verlag Chemie 1968, volume 2a, page 329a). The iron containing material used should be such that, firstly, the nonmetallic impurities are coarser than the resulting pigment particles so that they can easily be separated from the pigment particles and, secondly, the iron particles can be suspended in the reaction medium. The particle size of the iron containing powder used should be between 0.5$\mu$ and 500$\mu$, preferably between 0.5$\mu$ and 350$\mu$.

Iron ores such as ilmenite constitute a particularly advantageous starting material for the preparation of the iron powder. The iron content in ilmenite can be reduced to metallic iron by one of the known processes (see e.g. U.S. patent specification No. 3,257,198). If partially reduced ilmenite is used as iron-containing material for the purpose of the process of the invention, both a highly reactive iron powder is obtained suitable for the preparation of very pure iron oxide pigments and, as a by-product, a material which has a high titanium dioxide content and which may be used for the preparation of titanium tetrachloride by chlorination, if necessary after it has been steeped in acid.

The ferrous salt employed in the aqueous solution may be any water-soluble ferrous salt. Ferrous acetate, ferrous chloride and ferrous sulphate are examples. The latter two are preferred. The pH of the suspension may be adjusted during preparation of the pigment to values of from 1–6, preferably from 3 to 6. Dependent on the pH, in this range pigments from a deep red to a greenish yellow colour can be obtained. Thus the pigments are intensively yellow in the upper pH area (pH$\approx$5) for example and red in the lower pH area. The temperature of the reaction mixture is advantageously adjusted to from 50° C. to 100° C. and preferably from 60° C. to 95° C.

The modifying substances are to be understood for the purpose of the process of the invention to mean any substances which are capable of influencing the crystallized form and hence the quality of the iron oxide pigment. Substances suitable for this purpose are primarily suspensions of iron oxides or hydrated iron oxides, e.g. so-called red or yellow nuclei. These nuclei. such as $\alpha$-FeOOH (yellow) or $\alpha$-$Fe_2O_3$ (red) are added to the reaction mixture in an amount of about 8 to 12 g./l.

Other modifying substances may also be present during formation of the pigment in addition to the aforesaid nuclei, e.g. phosphates, silicates or bases which contain nitrogen. Preferred modifying agents include $\alpha$-FeOOH, $\gamma$-FeOOH, $\delta$-FeOOH and $\alpha$-$Fe_2O_3$.

The process according to the invention will now be described more fully with reference to one particularly advantageous embodiment of the process in which the finely divided, iron-containing material used is reduced ilmenite.

A nuclear suspension is added to a ferrous salt solution in a reaction vessel. The suspension is then heated to temperatures of from 60° C. to 95° C. and at the same time a stream of air is passed through the reaction mixture. At the same time, iron-containing powder which has been prepared by the direct introdutcion of ilmenite or previously reduced ilmenite with gaseous or solid reducing agents, is added to this mixture. The iron containing powder, in which the particle sizes vary from $20\mu$ to $500\mu$, is kept in suspension by means of stirrer mechanisms, pump circulation systems or other agitators. The reaction is generally completed after 12 to 13 hours. The suspension is then worked up, preferably by a wet working up process in which the pigment is separated from the titanium dioxide concentrate by virtue of its different density and particle size. Hydrocyclones, hydroseparators, settling tanks and other apparatus suitable for this purpose may be used. When free from impurities, the pigment is washed free from salt, filtered, dried and optionally ground.

The oxides obtained in this way are very pure, intensely coloured pigments useful in the preparation of cosmetics, paints, lacquers, etc. in the usual way.

The process according to the invention will now be further illustrated with the aid of examples.

EXAMPLE 1

$\alpha$-FeOOH yellow paint 0.6 l. of 20% sodium hydroxide solution was added to 6 l. of 10% ferrous sulphate solution with stirring at 25° C. Air was then introduced at a rate such that oxidation was completed after about 4 hours.

EXAMPLE 1(a)

1.45 l. of the above nuclear suspension and 3.05 l. of a 1% ferrous sulphate solution were heated to 80° C. in a 5 l. remanite vessel equipped with a stirrer. Air was introduced into this suspension at the rate of 180 l./h. and 240 g. of iron powder (Fa.Merck's Ferrum Reductum) having a particle size of 0.5 to $5\mu$ were added. The pH rose from 3.0 to 6.1 in the course of 15 minutes after the addition of the iron powder. The pH started to drop after a reaction time of 3 hours. The experiment was stopped when the pH had dropped to 2.5. The FeOOH obtained, which had a dirty olive colour, contained $Fe_3O_4$ and was not usable as a pigment.

EXAMPLE 1(b)

The experiment was set up as in 1(a) but the iron powder was added slowly at such a rate that the pH was maintained within the range of from 3.6 to 4.4. The experiment was terminated after 20 hours and the pigment was filtered, washed and dried. 416 g. of a very pure, intensely coloured yellow pigment which had a green tinge were obtained. The volume/time yield was 4.2 g./l./h.

EXAMPLE 2

$\alpha$-FeOOH yellow pigment 35.5 kg. of pyritex cinders having an $Fe_2O_3$ content of 86% and particle sizes of between 63 and $300\mu$ were reduced with hydrogen in a fluidized bed reactor at 750° C. 26 kg. of a powder of a particle size of 20 to $200\mu$ and which contained 81% of metallic iron were obtained.

150 l. of ferrous sulphate solution and 150 l. of yellow nuclear suspension were introduced into a 450 l. vessel equipped with a stirrer. The resulting suspension contained 25 g. of iron sulphate and 9.8 g. of yellow nucleus per litre. After heating the suspension to 80° C. air was introduced and the 26 kg. of reduced pyrites cinders were added at a uniform rate in the course of 25 hours. The pH value was between 3.7 and 4.3 during the process of pigment formation. After 30 hours, the metallic iron was used up and the yellow pigment showed no further changes. The suspension, which contained 120 g. of FeOOH per litre, was pumped from the container into a conical tank for settling. When the coarser particles had settled, the suspension was diluted with water and at the same time pumped through a hydrocyclone. The resulting purified pigment suspension was washed free from salt in a centrifuge. After dying, 32 kg. of a pure, intensity coloured $\alpha$-FeOOH yellow pigment were obtained. The volume/time yield of the process of pigment formation was 3.2 g./l. per hour.

EXAMPLE 3(a)

Reduction of ilmenite 100 g. of ilmenite containing 49.0% of $TiO_2$, 38.1% of FeO and 9.7% of $Fe_2O_3$ and having particle sizes of between $63\mu$ and $200\mu$ were oxidized with air in a fluidized bed reactor at 900° C. for 30 minutes. The ilmenite was then reduced with hydrogen at 800° C. for one hour and cooled under nitrogen. The reduced ilmenite contained 41.1% of metallic iron and less than 1% of $Ti_2O_3$ and had a particle size of $40\mu$ to $300\mu$.

EXAMPLE 3(b)

Preparation of $\alpha$-FeOOH yellow pigment, using reduced ilmenite

A ferrous sulphate solution and a yellow nuclear suspension were mixed in an electrically heated stirrer vessel to produce 4.5 l. of a suspension containing 25 g. of iron sulphate per litre and 8.2 g. of FeOOH per litre. Air was introduced at a rate of 180 l./h. at a temperature of 78° C. and 650 g. of reduced ilmenite having a particle size of $40\mu$ to $300\mu$ were added. The pH thereupon rose from 3.0 to 5.3 in the course of 5 minutes and reached 6.9 after a further 20 minutes. The pH stayed between 5.6 and 6.2 in the course of the next 3 hours and then gradually dropped to pH 2 in the course of a further 5 hours. The experiment was stopped when the pH had dropped to 2. FeOOH which contained $Fe_3O_4$ and was not usable as pigment was obtained as in Example 1(a).

EXAMPLE 3(c)

Example 3(b) was repeated except that the reduced ilmenite was added at a measured rate so that the pH was maintained at substantially 4. The metallic iron was used up after 20 hours. The experiment was stopped after a total of 23 hours by diluting the suspension with water and removing the titanium dioxide residue by decanting. The pigment was washed in a centrifuge and then dried. 440 g. of an intensely coloured, very pure yellow pigment which had a strong green tinge were obtained. The volume/time yield was 39 g./l./h. After decanting, the titanium dioxide residue contained 1.8% of iron, 0.9% of which could be removed by washing with 15% sulphuric acid.

EXAMPLE 3(d)

The experiment of Example 3(c) was repeated with the same quantities of substances but instead of reacting them in a stirrer vessel they were reacted in a glass container 60 cm. in height which had a sintered bottom and was equipped with a pump circulating device. The experiment was completed after 24 hours. The metallic iron was used up in the reaction. The $\alpha$-FeOOH yellow pigment did not have such a strong green tinge as in the previous experiment but it was also very pure and intensely coloured.

EXAMPLE 3(e)

Preparation of $\alpha$-FeOOH pigment from scrap iron 4.5 l. of a suspension containing 25 g. of $FeSO_4$ per litre and 8.2 g. of FeOOH per litre were prepared as in Example 3(b). 400 g. of iron strip (65 mm. wide, 0.5 mm. thick) were arranged on a sieve in a heatable 5-litre stirrer vessel in such a manner that the whole surface could easily be reached by the liquid, and the suspension was poured over it. Air was introduced at the rate of 50 l./h. at 78° C. with stirring. 452 g. of pigment and 137 g. of unreacted iron were isolated after 28 hours. The pigment was distinctly less pure and more orange than that prepared in Example 3(b). The volume/time yield was 3.29 g./l./h.

EXAMPLE 3(f)

Preparation of $\alpha$-FeOOH pigment from scrap iron

The experiment was carried out in the same way as in Example 3(d) but at a much lower rate of stirring. 443 g. of pigment which was similar in its properties to the pigment prepared in Example 3(b) were isolated after 67 hours. The volume/time yield was 1.37 g./l./h.

EXAMPLE 3(g)

Preparation of $\alpha$-FeOOH yellow pigment from reduced ilmenite

The preparation of $\alpha$-FeOOH yellow pigment according to Example 2 was repeated except that 53 kg. of reduced ilmenite of a particle size of 40 to 300$\mu$ were added instead of 26 kg. of reduced pyrites cinders. The course of the experiment was similar to that in Example 2. After 30 hours, the suspension was separated in a hydroseparator into a pigment suspension which was almost free from titanium dioxide and a titanium dioxide concentrate. The pigment suspension was freed from the remaining titanium dioxide particles by means of a hydrocyclone. The yellow pigment obtained after washing and drying was very pure and intensively coloured and had a slightly stronger green tinge than the pigment prepared in Example 2. The volume/time yield was 3.16 g./l./h.

EXAMPLE 3(h)

Preparation of $\alpha$-FeOOH yellow pigment from scrap iron

The preparation of pigment according to Example 2 was repeated, but instead of iron powder, 30 kg. of iron scrap (60 mm. wide, 1 mm. thick, 5000 mm. long) were added. Air was introduced at the rate of 300 l./h. at 80° C. with moderately rapid stirring. The rate of introduction of air and the rate of stirring were increased in the course of the experiment. 32.36 kg. of a pigment which had practically the same properties as the pigment prepared in Example 3(f) were isolated after 180 hours. The volume/time yield was 0.54 g./l./h.

EXAMPLE 4

$\gamma$-$Fe_2O_3$ 3.5 l. of a $\gamma$-FeOOH nuclear suspension prepared according to DAS 1,223,352, Example 1, experiment No. 1.04 and 1 l. of 3.8% ferrous sulphate solution were heated 80° C. in a 5 l. vessel equipped with a stirrer. 500 g. of reduced ilmenite of a particle size of 40$\mu$ to 300$\mu$ were reacted in the course of 20 hours with introduction of air, the ilmenite being added at such a rate to the reaction mixture that the pH value was maintained within the range of from 3.5 to 4.1. The pigment was then separated from the titanium dioxide residue and worked up in the usual manner. 354 g. of orange red $\gamma$-FeOOH were obtained. This $\gamma$-FeOOH was converted into true brown ferromagnetic $\gamma$-$F_2O_3$ by dehydration at 300° C.

EXAMPLE 5(a)

Preparation of $Fe_2O_3$ pigment from reduced ilmenite

A nuclear suspension was prepared in a slightly acidic medium in accordance with BRD Pat. No. 1,040,155. 1.9 l. of nuclear suspension were mixed with 2.7 l. of a 4% iron sulphate solution in a 5 l. stirrer vessel. Air was introduced into the mixture at the rate of 200 l./h. at 80° C. and 650 g. of reduced ilmenite of a particle size of 40$\mu$ to 300$\mu$ were added at such a rate that the pH was maintained at a value in the range from 3.8 to 4.5. The experiment was finished after 32 hours. The metallic iron was completely used up. The pigment was separated from the titanium dioxide residue as in Example 2. 375 g. of a luminous, intensely coloured red pigment which had a blue tinge were obtained after drying. Volume/time yield was 2.6 g./l./h.

The titanium dioxide residue still contained 3.3% of $Fe_2O_3$, 2.4% of which could be removed by washing with acid.

EXAMPLE 5(b)

Preparation of $Fe_2O_3$ red pigment from scrap iron 4.5 l. of a nuclear suspension containing $FeSO_4$ were prepared as in Example 5(a). 500 g. of iron strip (65 mm. wide, 0.5 mm. thick) were introduced into the suspension and air was passed in at the rate of 60 l./h. with stirring at 80° C. The reaction time required for obtaining a pigment having substantially the same properties as that prepared in Example 5(a) was 85 hours. 388 g. of pigment and 256 g. of unreacted iron were isolated at the end of this time. The volume/time yield from the process of preparation of the pigment was 0.95 g./l./h.

EXAMPLE 6(a)

Preparation of $Fe_2O_3$ red pigment from reduced ilmenite

A nuclear suspension was prepared in an alkaline medium in accordance with French Pat. No. 1,085,635. 4.5 l. of a suspension of 20 g. of nuclei and 100 g. of $FeSO_4$ were prepared by stirring and the suspension was heated to 75° C. Air was introduced at the rate of 200 l./h. and 600 g. of reduced ilmenite of a particle size of 40$\mu$ to 300$\mu$ were added. After 30 hours, the pigment suspension was separated from the titanium dioxide residue in the usual manner, washed and dried. 358 g. of a pure, intensely coloured red pigment were obtained. The volume/time yield was 2.5 g./l./h.

EXAMPLE 6(b)

Preparation of $Fe_2O_3$ red pigment from scrap iron 4.5 l. of a suspension containing 20 g. of nuclei and 100 g. of $FeSO_4$ were prepared as in Example 6(a). 500 g. of scrap iron (65 mm. wide, 0.5 mm. thick) were added to the suspension and air was introduced at the rate of 60 l./h. at 75° C. with stirring. 241 g. of iron were used up in 75 hours. 364 g. of pigment which was substantially similar to the pigment prepared in Example 6(a) as regards tone and intensity of colour were isolated. The volume/time yield was 1.0 g./l./h.

What is claimed is:

1. A process for preparing iron oxide and hydrated iron oxide pigments, as well as a titanium dioxide concentrate which comprises introducing reduced ilmenite as a finely divided particle having a particle size of between 0.5$\mu$ and 500$\mu$ into an aqueous ferrous salt solution together with an oxygen-containing gas at a rate maintaining the pH of the solution between 1 and 6 while agitating said solution to maintain said introduced reduced ilmenite in suspension and thereafter separating resulting pigment and titanium dioxide.

2. The process of claim 1 wherein the pH of the solution is maintained between 3 and 6.

3. The process of claim 1 wherein the particle size of said introduced material is from $0.5\mu$ to $350\mu$.

References Cited

UNITED STATES PATENTS

| | | | |
|---|---|---|---|
| 1,998,541 | 4/1935 | Haberland | 106—304 |
| 2,045,808 | 6/1936 | Smyly | 23—200 |
| 2,939,767 | 6/1960 | Martin | 23—200 |
| 3,009,821 | 11/1960 | Bennetch | 23—200 |
| 2,339,808 | 1/1944 | Raynestad et al. | 23—200 |
| 2,937,927 | 5/1960 | Ayers et al. | 23—200 |
| 1,385,769 | 7/1921 | Ball | 23—200 |

FOREIGN PATENTS

| | | | |
|---|---|---|---|
| 691,457 | 5/1953 | Great Britain | 23—200 |
| 651,796 | 2/1965 | Belgium | 23—200 |

OTHER REFERENCES

Babor et al.: General College Chemistry, Thomas Y. Crowell & Co., N.Y., 1940, p. 66.

GEORGE O. PETERS, Primary Examiner

U.S. Cl. X.R.

106—304; 423—86, 140, 610

UNITED STATES PATENT OFFICE
CERTIFICATE OF CORRECTION

Patent No. 3,755,554        Dated August 28, 1973

Inventor(s) Gunter Lailach, Fritz Rodi, Heribert Bade and Heinz ~~Koll~~er

It is certified that error appears in the above-identified patent and that said Letters Patent are hereby corrected as shown below:

Col. 3, line 27, "introdutcion" should read -- reduction --.

Col. 4, line 4, "pyritex" should read -- pyrites --.

Col. 4, line 26, "dying" should read -- drying --.

Signed and sealed this 17th day of September 1974.

(SEAL)
Attest:

McCOY M. GIBSON JR.        C. MARSHALL DANN
Attesting Officer        Commissioner of Patents